US007298535B2

(12) United States Patent
Kuutti

(10) Patent No.: US 7,298,535 B2
(45) Date of Patent: Nov. 20, 2007

(54) DIGITAL SITUATION INDICATOR

(76) Inventor: Tommi Lennart Kuutti, 4970 Freedom Cir., Lake Worth, FL (US) 33461

(*) Notice: Subject to any disclaimer, the term of this patent is extended or adjusted under 35 U.S.C. 154(b) by 560 days.

(21) Appl. No.: 10/335,566

(22) Filed: Jan. 3, 2003

(65) Prior Publication Data

US 2004/0131498 A1 Jul. 8, 2004

(51) Int. Cl.

| | |
|---|---|
| ***G03H 1/00*** | (2006.01) |
| ***G02B 5/32*** | (2006.01) |
| *G02B 3/00* | (2006.01) |
| *G02B 27/14* | (2006.01) |

(52) U.S. Cl. ........................... 359/16; 359/13; 359/19; 359/637; 359/642

(58) Field of Classification Search ........... 340/539.27, 340/506

See application file for complete search history.

(56) References Cited

U.S. PATENT DOCUMENTS

| | | | | |
|---|---|---|---|---|
| 5,949,582 | A * | 9/1999 | Coombs | 359/630 |
| 6,044,293 | A * | 3/2000 | Lucey et al. | 600/546 |
| 6,198,394 | B1 * | 3/2001 | Jacobsen et al. | 340/573.1 |
| 6,242,711 | B1 * | 6/2001 | Cooper | 219/130.01 |
| 6,464,392 | B1 * | 10/2002 | Carrieri et al. | 374/45 |
| 2002/0008625 | A1 * | 1/2002 | Adams et al. | 340/573.1 |
| 2002/0009119 | A1 * | 1/2002 | Matthew et al. | 374/45 |
| 2002/0063225 | A1 * | 5/2002 | Payton | 250/559.22 |
| 2003/0034935 | A1 * | 2/2003 | Amanai et al. | 345/7 |

* cited by examiner

*Primary Examiner*—Jill Warden
*Assistant Examiner*—Neil Turk
(74) *Attorney, Agent, or Firm*—McHale & Slavin, P.A.

(57) ABSTRACT

A personal monitoring system to be worn by an individual in a hazardous situation comprises an enclosed face mask which includes a transparent shield over at least the eves a sensor module secured to the individual which includes a plurality of sensors, a microprocessor and an RF transmission means operable to transmit data obtained by the sensors. The face mask includes a heads-up display comprising a housing containing an electroluminescent display panel, an optical lens, a microprocessor, and an RF receiver operable to receive data from the sensor module. The housing is configured to allow the mounting of the display panel and optical lens in a spaced-apart arrangement so that the display panel is viewed through the lens. The system of the invention also includes a central Incident Commander Module comprising an RF transceiver and a display panel which can receive and display sensor data from a plurality of head-worn devices.

14 Claims, 13 Drawing Sheets

DIGITAL SITUATION INDICATOR

FIELD OF THE INVENTION

The present invention relates to a digital situation indicator to be worn by firefighters and the like, and more particularly to a personal monitoring and alarm system which includes a face mask in combination with a heads up display, sensor module, and communications means.

BACKGROUND OF THE INVENTION

When entering a burning building, firefighters wear breathing apparatus consisting of an air tank, regulator, face mask and pressure gage. Typically, firefighters work in dense smoke, where the visibility may be only a few inches.

Firefighters carry a personal alert safety system (PASS) device, which activates an audible alarm, if they stop moving. The PASS device has a "Pre-Alert" stage, which allows the firefighter a pre-specified number of seconds to move or to shake the PASS device, before the alarm is activated. In addition to the PASS device, firefighters need to know certain information about their constantly changing situation in order to safely and efficiently perform their work.

At minimum, firefighters need to know at all times, how much air is remaining in their tank. The pressure of the air tank will only tell part of the story. Two firefighters with identical pressure gage readings may each have a different number of minutes of air time remaining, depending on their respective rates of air consumption. The rate of air consumption varies from firefighter to firefighter according to size, physical conditioning, and metabolic rate. The rate of air consumption also can change from minute to minute for an individual firefighter depending on the intensity of the physical work being performed, stress, and other factors. Therefore, the firefighter needs to know both the air pressure and its equivalent in number, of minutes remaining, at any given time.

For safety reasons, the firefighter also needs to know the ambient temperature, its time-dependent effect on his or her cumulative heat stress level, and whether flashover conditions are impending. Before opening a door inside a burning building, the firefighter needs to know whether there is a raging fire on the other side. During so-called "mop-up" operations after the fire has been extinguished, firefighters typically have to use axes to inspect inside walls, to ensure that no hidden fires exist.

Firefighters wear thick gloves, carry axes and water hoses, and need their hands free to be able to perform their work. Gages that attach to the air hose and hang from the firefighter's side are inconvenient to continuously pick-up and, in dense smoke, are almost impossible to read. When brought up to the face mask, the gage is too close for the firefighter's eyes to focus. For this reason, an elementary display system has recently been invented, consisting of a series of Light Emitting Diodes (LEDs) mounted inside the face mask. The drawback to this approach is that the LEDs provide much less information than gages provide.

A helmet-mounted display system such as those used by military jet fighter pilots, which projects data onto the visor of the helmet, would offer firefighters a possible solution. However, the cost of a single helmet could absorb an annual budget. The cost to equip all firefighters worldwide would be staggering.

Another occupational group working with impaired visibility are welders. When welding certain types of material, such as stainless steel or aluminum, certain amperage settings for the welds may be specified in the manufacturing drawings, and it is necessary to the welder from time to time to check the amperage gage. In many cases the welder has to work several meters away from the welding machine, and he has to flip up his helmet and walk back to read the gage. If the welder is working on a ladder or a scaffold, he has to climb down or ask someone else to read the amperage.

Remote controls for setting the amperage are available, and to save time welders sometimes try to set the amperage based on experience. If the amperage is set incorrectly with this method, the result can be a weld that is out of the specification or a rejected part.

Also soldiers suffer from impaired visibility when chemical warfare agents (CWA) are present and they have to wear gas masks and protective clothing. Sometimes soldiers have to work in even more impaired visibility conditions, for example after a bombardment the battlefield is covered with smoke.

Soldiers carry CWA detection instruments, which indicate the presence of any chemical warfare agent. When the CWA detection instrument detects the presence of CWA, it activates an audible alarm, and soldiers put on their gas masks and protective clothing. The CWA detection instrument continues to monitor the level of present CWA, and informs the soldiers when it is safe to take of the gas mask.

The CWA detection instrument also continuously measures the concentration of chemical warfare agents in the surrounding. To be all the time aware of the current concentration, soldiers need to look at the instrument frequently. Current instruments are handheld and soldiers need pick them up to read them, same time forcing him to release grip from his tools or weapon.

Displays of these current handheld instruments are small and they are not protected from mud and dirt. Also dense smoke can impair the readability of the instrument. To improve the readability of these current CWA detection instruments their displays are often illuminated. This in turn can reveal the soldier to the enemy. One detection instrument is also needed for each soldier, which adds weight to the soldier's gear and increases costs.

The incident commander (IC) is in charge of all firefighters at the scene of the fire. Each firefighter gives the IC a personal accountability tag (PAT) upon arrival at the scene. The IC keeps track of the firefighters by the use of a unit identification pad (UIP) and a large marker board. The drawback is that once the firefighters are inside the fire, the IC has no method of knowing how much air each firefighter has left, what temperature the firefighters are operating in, what is their heat stress level or PASS device status.

The commanding officer (CO) of a certain part of the battlefield is tracking the overall CWA concentration of that area. Soldiers report their instrument readings to the CO either using a radio or a courier. The drawback is that the CO can not keep track of the CWA concentration or the dosage of an individual soldier in real time.

Firefighters, welders and soldiers are just examples for possible users of digital situation indicator of the invention. This kind of indicators can be utilized in many fields where personal monitoring and alarming are essential.

SUMMARY OF THE INVENTION

A primary object of the present invention is to provide a digital situation indicator, especially a personal monitoring and alarm system that will overcome the shortcomings of the prior art devices. Another object of the invention is to provide a new digital situation indicator.

The situation indicator SI of the invention offers a digital heads-up display HUD solution with a multitude of new features. The SI offers a truly digital, very easily legible HUD, at a cost no more expensive than the existing technology.

The SI system has three separate units:

Sensor Module SM for monitoring desired data,

Heads-Up Display HUD mounted in the face mask F of the operating person, and

Incident Commander Module ICM at a distance from the operating person.

The sensor module may contain a pressure sensor, ambient temperature sensor, infrared (IR) temperature sensor, an "SOS" Button and an integrated PASS device. A microprocessor analyses the sensor data and computes air time remaining in minutes, heat stress level, and impending flashover danger. The sensor module transmits sensor and computed data to both the HUT and the ICM. The communication between the parts is preferably wireless such as radio frequency (RF) communication.

The sensor module may also contain a amperage sensor. The sensor module transmits sensor and computed data to the HUD using preferably wireless communication, such as RF communication.

The sensor module may also contain a chemical warfare agent sensor. A microprocessor analyses the sensor data and computes CWA concentration in the surrounding and the dosage of an individual soldier.

The heads-up display incorporates a miniature, transflective LCD display unit with electro-luminescent panel backlighting, and optical enhancement means consisting of an achromatic doublet lens, optimized to correct for on-axis spherical and chromatic aberrations. The optics is designed for extra long eye relief, and the HUD is positioned in the face mask so that it does not restrict the firefighter's forward field of view.

With the SI system, before opening a door inside a burning building, the firefighter can point the IR sensor with a laser beam at the door, press the IR sensor button and read the temperature of the door on the HUD. During "mop-up" operations after the fire has been extinguished, the firefighter can scan the walls with the IR sensor to ensure that no hidden fires exist.

The Incident Commander Module consists of a self contained, portable, one-piece computer module, with backlit LCD display, touch screen or flex-membrane keypad, and RF transceiver. The ICM receives data transmissions from the sensor module. The ICM can also transmit text messages to the fire- or soldier. Once the firefighter is inside the fire, the ICM tracks each firefighter's situation, including elapsed time in the fire, air pressure, air time remaining in minutes, ambient temperature in the fire, heat stress level and PASS device status. It may also track each soldier's situation, including time under exposure to CWA and dosage of CWA.

The advantages of the invention are, among the other things, the following:

the SI system is a compact and versatile system for a user and, effective communication between different parts of the SI system, a user has clear and concise information for use, it is possible to follow a user with his/her sensor module inside the fire or equivalent work and communicate, if necessary.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

A preferred embodiments of the invention are presented in the following with reference to the attached drawing in which.

DESCRIPTION OF THE PREFERRED EMBODIMENT

Although the invention will be described in terms of a specific embodiment, it will be readily apparent to those skilled in this art that various modifications, rearrangements, and substitutions can be made without departing from the spirit of the invention. The scope of the invention is defined by the claims appended hereto.

The present invention is a personal monitoring system to be worn by an individual in hazardous situations includes a enclosed face mask configured to cover at least the eyes, nose and mouth of a person, with a transparent shield over at least the eyes. The system further includes a sensor module secured to the individual which includes a plurality of sensors, a microprocessor, and an RF transmission means operable to transmit data obtained by the sensors. The face mask includes a heads-up display comprising a housing containing an electroluminescent display panel, an optical lens, a microprocessor, and an RF receiver operable to receive data from the sensor module. The housing is configured to allow the mounting of the display panel and optical lens in a spaced-apart arrangement so that the display panel is viewed through the lens. The system of the invention also includes a central Incident Commander Module comprising an RF transceiver and a display panel which can receive and display sensor data from a plurality of head-worn devices.

The digital situation indicator of the invention can be utilized by firefighters, soldiers, and welders to provide a situation monitoring system with a heads up display. As disclosed herein, the invention contemplates three embodiments to be used in these respective environments.

The system highlights for a digital situation indicator (SI) for firefighters are as follows:

Pressure sensor—senses pressure remaining in the air tank of the firefighter;

Computes minutes of air time remaining at firefighter's current consumption rate;

Ambient temperature sensor—senses ambient temperature;

Flashover warning alarm—warns of impending flashover danger;

Computes heat stress level, in "degree-minutes";

Integrated Personal Alert Safety System PASS device;

Infrared (IR) sensor, activated by the push of a button—detects fire and/or high temperatures behind closed doors and inside walls;

Visible light LASER to show where IR sensor is pointed;

"SOS" button—transmits emergency signal to ICM and activates audible alarm;

Service records datalogger—records sensor module service and maintenance information in non-volatile memory.

Figure 1:
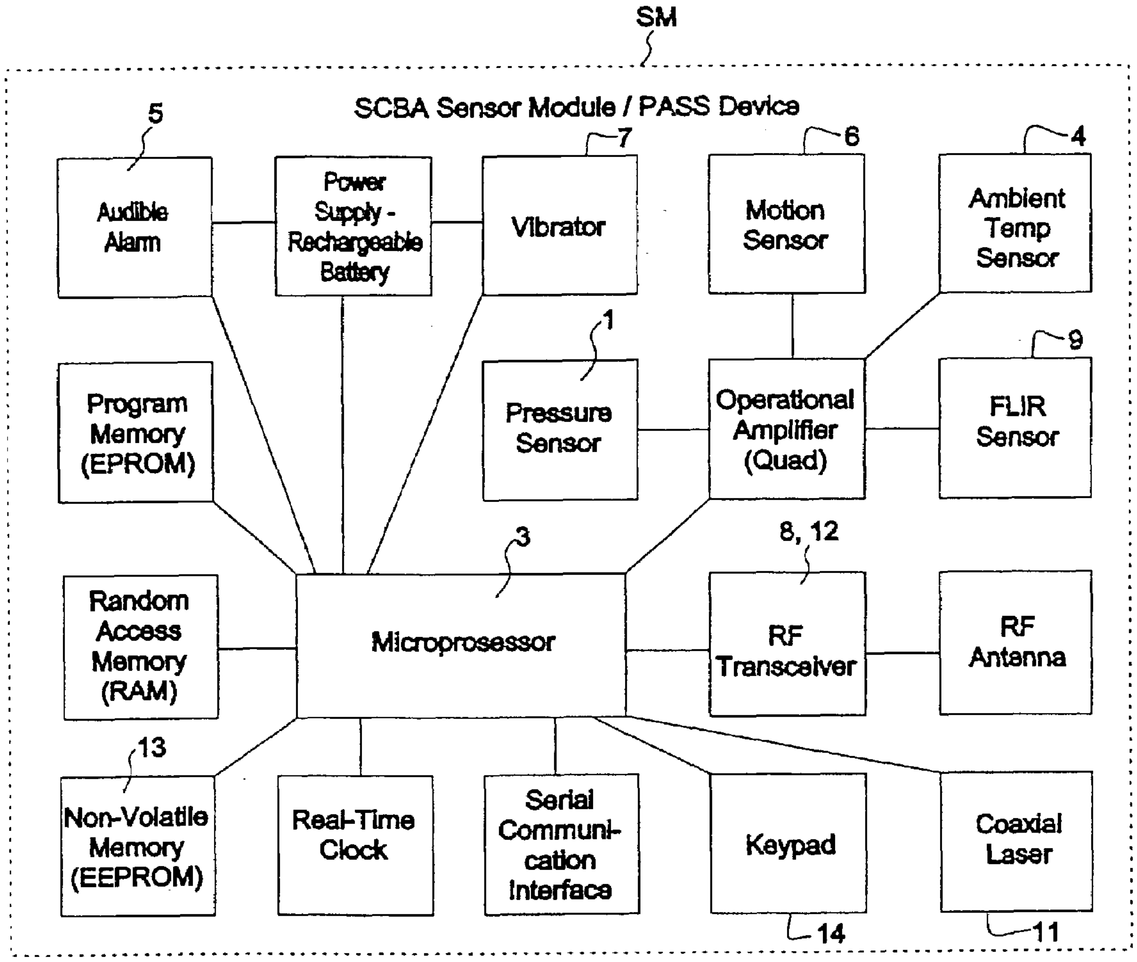
FIG. 1 shows a schematic block diagram of the sensor module according to the first embodiment of the invention.
Figure 6:
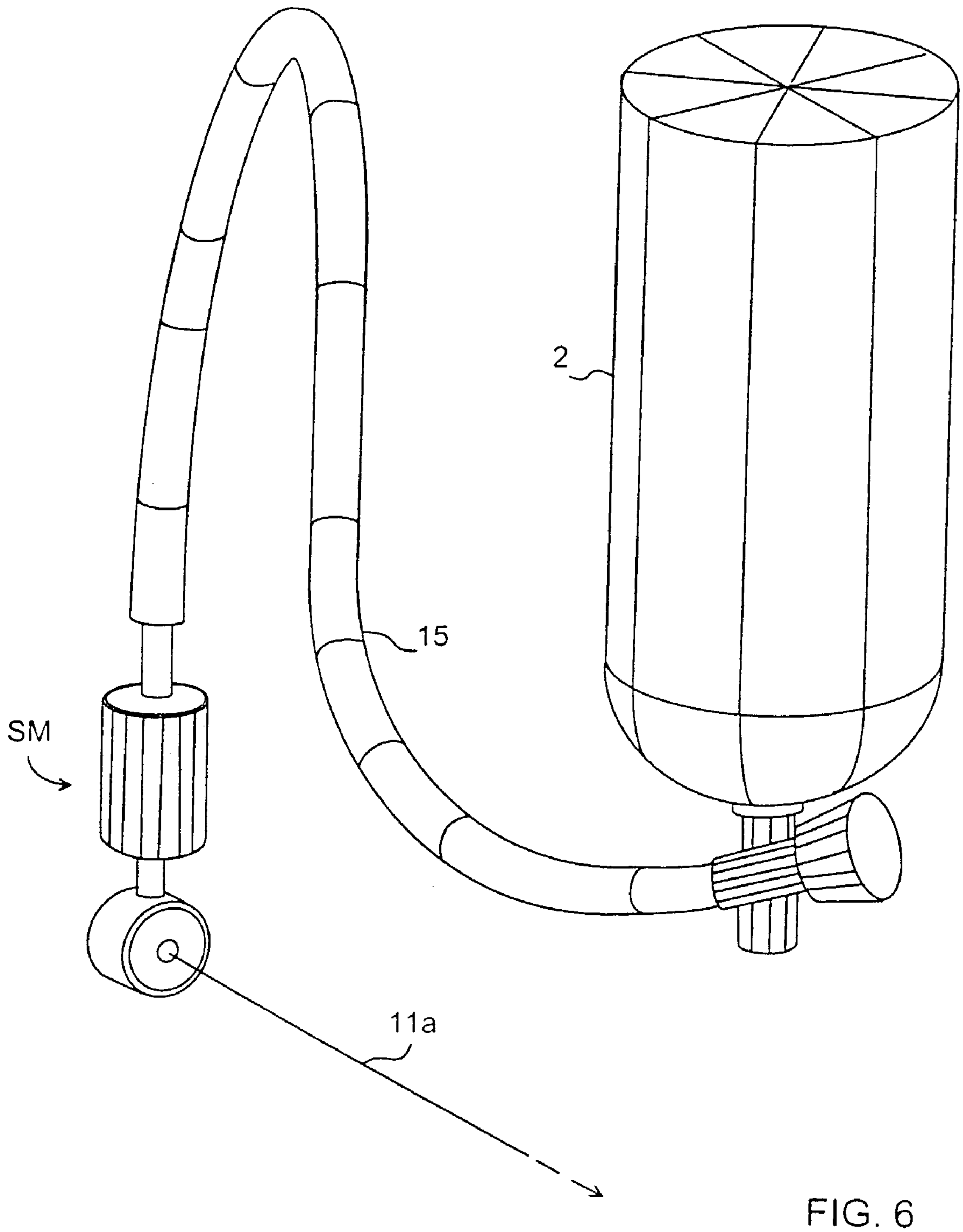
FIG. 6 shows a perspective view of the sensor module attached to an air tank.

The sensor module SM in accordance with one embodiment of the invention, as shown in FIG. 1, has the following parts and features:

Sensor module SM scans all sensor readings and transmits updated sensor data to both HUD and ICM, preferably every 3 seconds;

Pressure sensor 1—senses air pressure in the air tank 2 (FIG. 6);

Control unit, such as microprocessor 3, tracks firefighter's rate of air consumption, then computes air time remaining in minutes at current consumption rate;

Ambient temperature sensor 4—senses ambient temperature;

Flashover warning alarm—software analyses sensor data and detects, when ambient conditions are appropriate for impending flashover. Microprocessor 3 transmits flashover warning to both HUD and ICM, and/or activates audible alarm 5.

Figure 15:
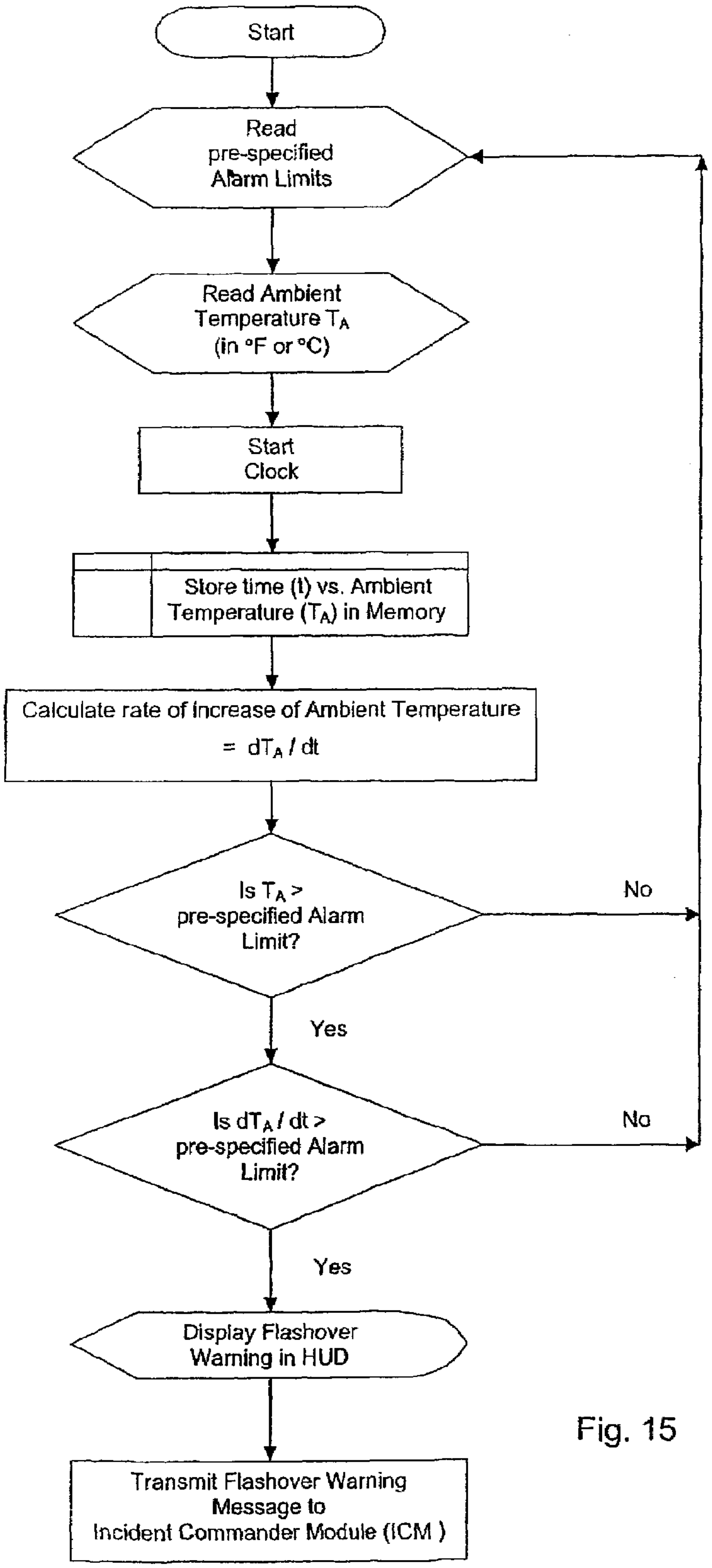
FIG. 15 shows a flow diagram of the Flashover Warning Alarm software according to the first embodiment of the invention.

The operation of the flashover warning software is described in the flow chart of the FIG. 15. First the pre-specified alarm limits and the ambient temperature TA are read and the real time clock is started. Then the ambient temperature is stored in to the memory as a function of time and the rate of increase of ambient temperature is calculated. After this the ambient temperature is compared to the pre-specified alarm limit and if the ambient temperature is lower than the limit, the program returns to the beginning.

Figure 16:
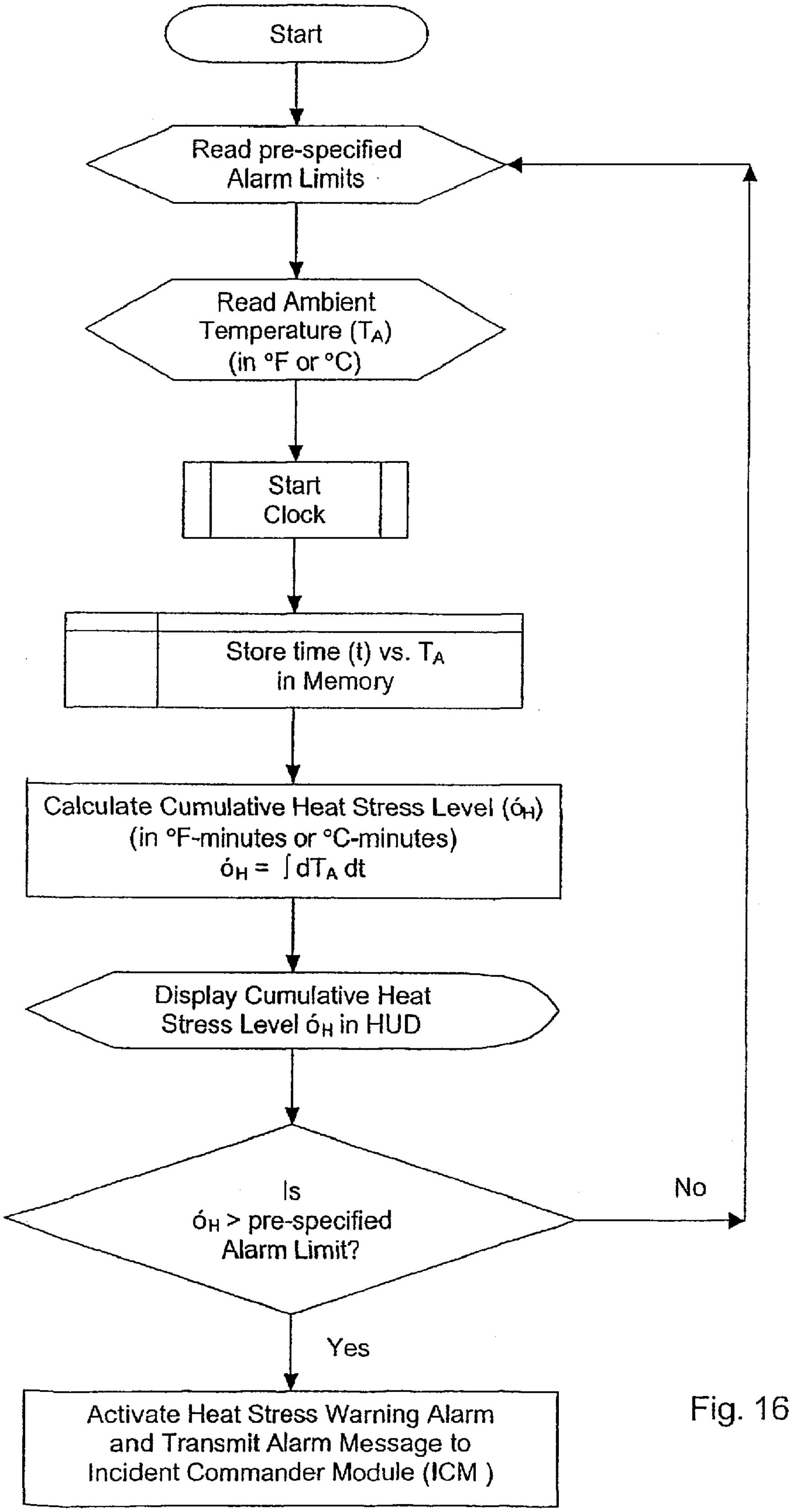
FIG. 16 shows a flow diagram of the Cumulative Heat Stress Level calculating software according to the first embodiment of the invention.

If the ambient temperature is higher than pre-specified alarm limit, the rate of increase of ambient temperature is compared to the pre-specified alarm limit. If the rate of increase of ambient temperature is lower than the limit, the program returns to the beginning. If the rate of increase of ambient temperature is higher than the pre-specified alarm limit, a flashover warning is displayed in the HUD. A flashover warning is also transmitted to the incident commander module;

Microprocessor 3 records firefighter's duration in high temperatures and computes cumulative heat stress level, in "degree-minutes". Software includes computation for rehabilitation (Rehab) time as well as multiple tank 2 usage. The operation of the cumulative heat stress level program is described in the flow chart of the FIG. 16. First the pre-specified alarm limits and the ambient temperature TA are read and the real time clock is started. Then the ambient temperature is stored in to the memory as a function of time and the cumulative heat stress level is calculated. After this the cumulative heat stress level is displayed in the HUD.

If the cumulative heat stress level is higher than the pre-specified alarm limit, a heat stress warning alarm is activated and an alarm message is transmitted to the incident commander module. If the cumulative heat stress level is lower than the pre-specified alarm limit program returns to the beginning;

Integrated personal alert safety system "PASS" device, including:

Motion sensor 6 to detect absence of motion by firefighter;

Vibrator 7 and/or audible alarm 5 to alert firefighter of "Pre-Alert" condition;

Transmitter 8 to transmit "Pre-Alert" condition data to HUD and ICM;

Audible alarm 5, activated after a pre-specified number of seconds of absence of motion.

Figure 17A:
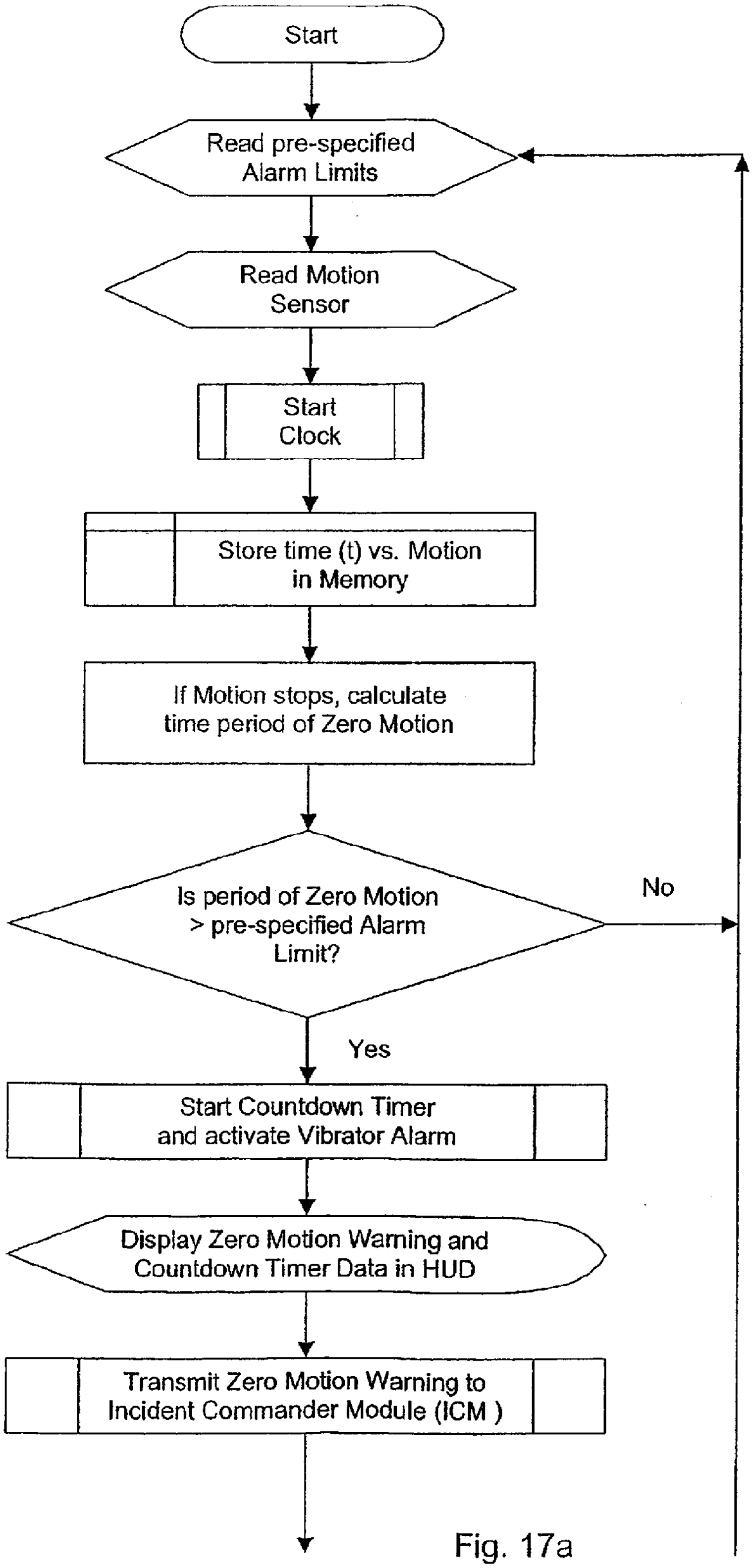
FIGS. 17*a* and 17*b* show a flow diagram of the Motion Sensor software according to the first embodiment of the invention.
Figure 17B:
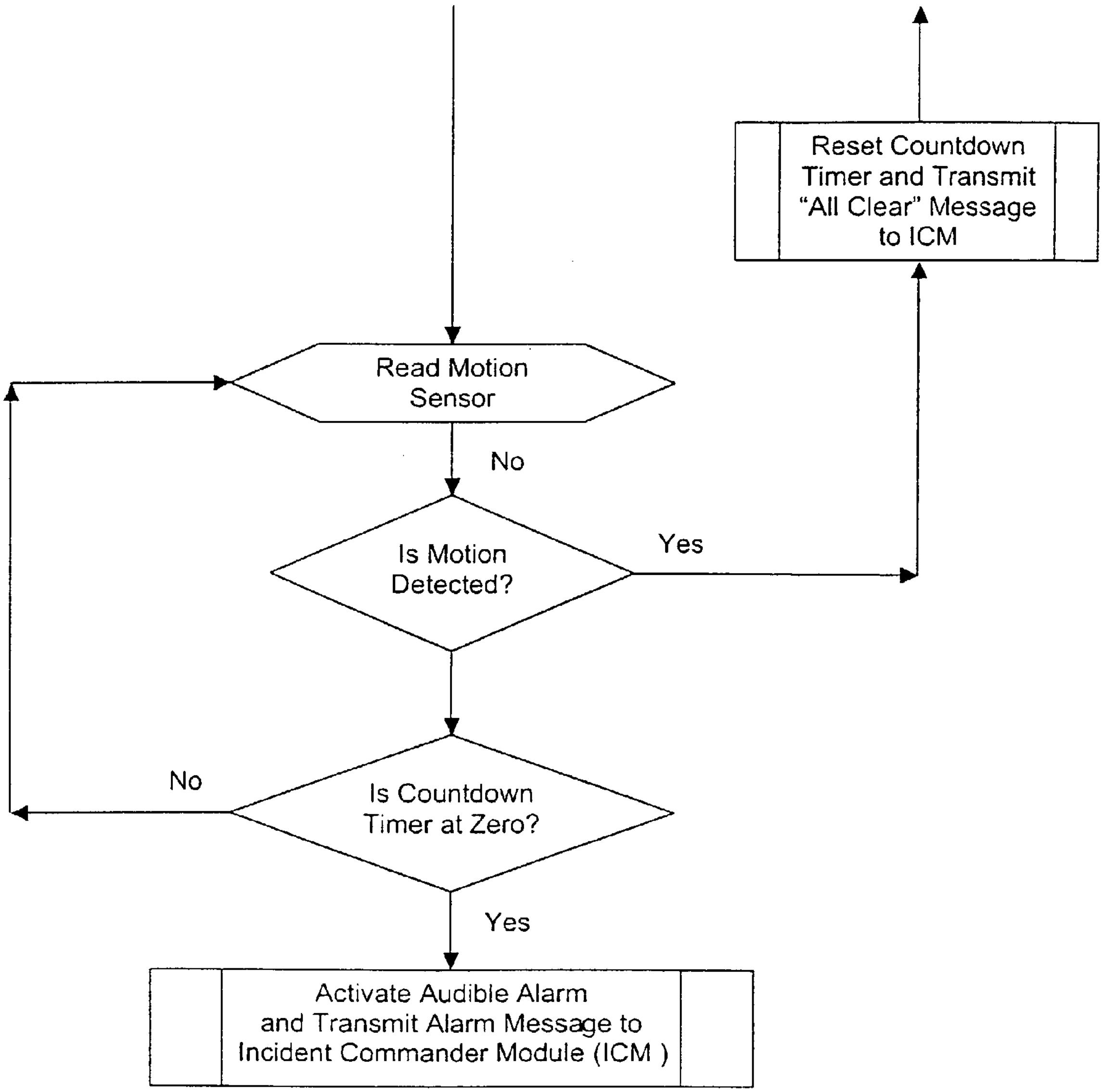

The operation of the motion sensor program is described in the flow chart of the FIGS. 17*a* and 17*b*. First the pre-specified alarm limits and the motion sensor are read and the real time clock is started. Then the motion is stored in to the memory as a function of time. If the motion stops, time period of zero motion is calculated.

If the time period of zero motion is shorter than the pre-specified limit, program returns to the beginning. Otherwise a countdown timer and a vibrator alarm are activated. Simultaneously zero motion warning and countdown timer data is displayed in the HUD. A zero motion warning is also transmitted to the incident commander module.

After this the motion sensor is read again. If motion is detected, the countdown timer is reset and a all clear message is transmitted to the incident commander module, and the program returns to the beginning. Otherwise the countdown timer is checked, and if there is still time left, motion sensor is read again. If countdown timer has reached zero, an audible alarm is activated and an alarm message is transmitted to the incident commander module.

Figure 7:
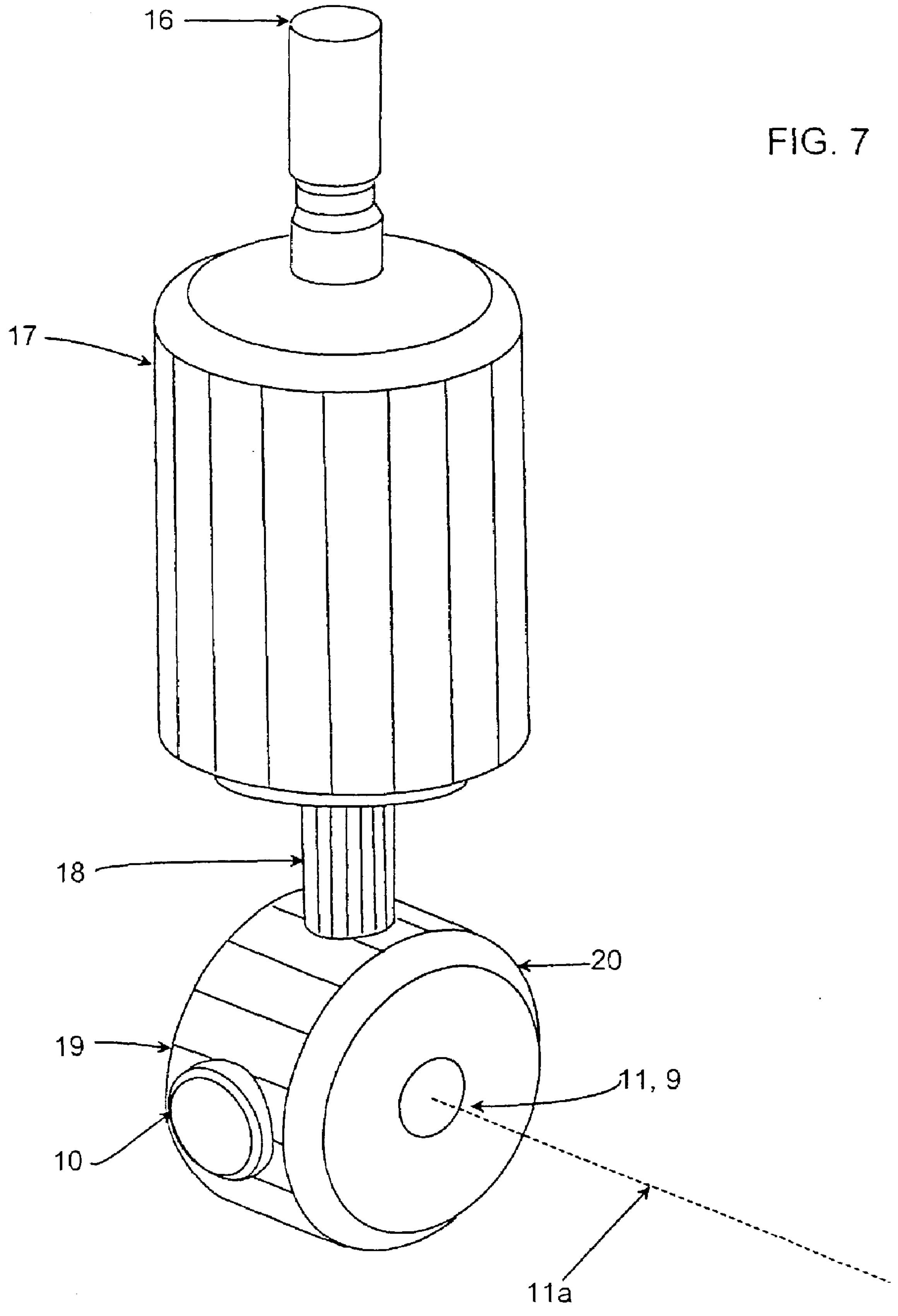
FIG. 7 shows more closely the sensor module.

Infrared (IR) sensor 9, activated by the push of a button 10 (FIG. 9)—detects infrared radiation emitted from closed doors and walls (and therefore fire and/or high temperatures behind closed doors and inside walls);

Visible wavelength coaxial LASER 11 (FIG. 7) to show with its beam 11*a* where IR-sensor 9 is pointed;

SOS-button 20—activates audible alarm and transmits signal to ICM;

Radio frequency (RF) receiver 12—receives text messages from ICM and forwards them to HUD;

Service records datalogger—records sensor module service and maintenance information in non-volatile memory 13;

"Automatic On" feature—activated upon opening of air tank regulator valve;

Optional button(s) 14 to allow firefighter to input his/her identification code;

Optional "Black Box" datalogger—records all sensor data during fire, with automatic "Time Stamping", Optional emergency locator transmitter (ELT), activated by PASS device or SOS-button.

Figure 4:
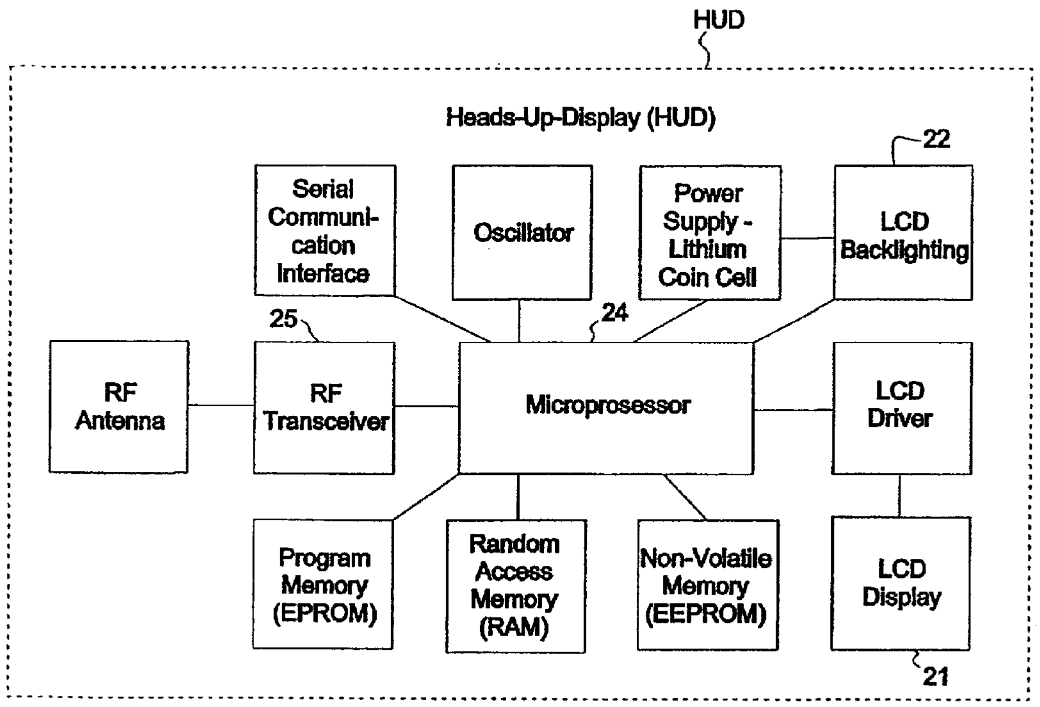
FIG. 4 shows a block diagram of the heads-up display.

The sensor module SM is attached to the pressure gage hose 15 of the air tank 2 as shown in FIG. 4. The sensor module SM has a connector 16 to the pressure hose 15, a housing 17 for the electronic circuitry (shown in FIG. 1) of the sensor module SM, RF antenna 18, IR-sensor and ambient temperature sensor in their housing 19, a waterproof switch 10 for IR-sensor 9 (FIG. 1), a laser 11 and SOS-button 20.

Figure 2:
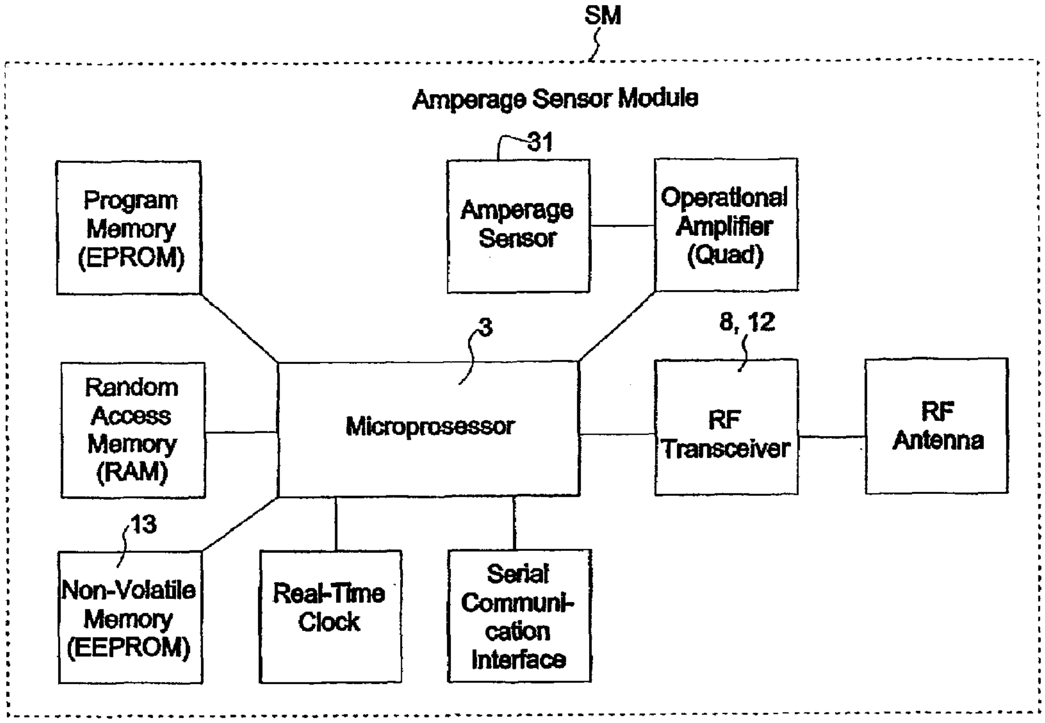
FIG. 2 shows a schematic block diagram of the sensor module according to another embodiment of the invention.

The system highlights for a digital situation indicator (SI) for welders are as follows:

Amperage sensor—senses the amperage of a welding machine;

The sensor module SM in accordance with another embodiment of the invention, as shown in FIG. 2, has the following parts and features:

Sensor module SM scans all sensor readings and transmits updated sensor data to HUD, preferably every 3 seconds;

Amperage sensor 1—senses amperage of a welding machine; Service records datalogger—records sensor module service and maintenance information in non-volatile memory 13;

"Automatic On" feature—activated upon turning the welding machine on;

Optional "Black Box" datalogger—records all sensor data during welding, with automatic "Time Stamping,", The sensor module SM is attached to the welding machine. The sensor module SM has a connector to the amperage gage, a housing for the electronic circuitry (shown in FIG. 2) of the sensor module SM and RF antenna.

The system highlights for a digital situation indicator (SI) for soldiers are as follows:

Chemical warfare agent sensor—senses the amount of CWA in the surroundings.

Computes soldier's total dosage of CWA;

Computes the remaining operating time at current CWA concentration;

"SOS" button—transmits emergency signal to ICM and activates audible alarm;

Service records datalogger—records sensor module service and maintenance information in non-volatile memory.

Figure 3:
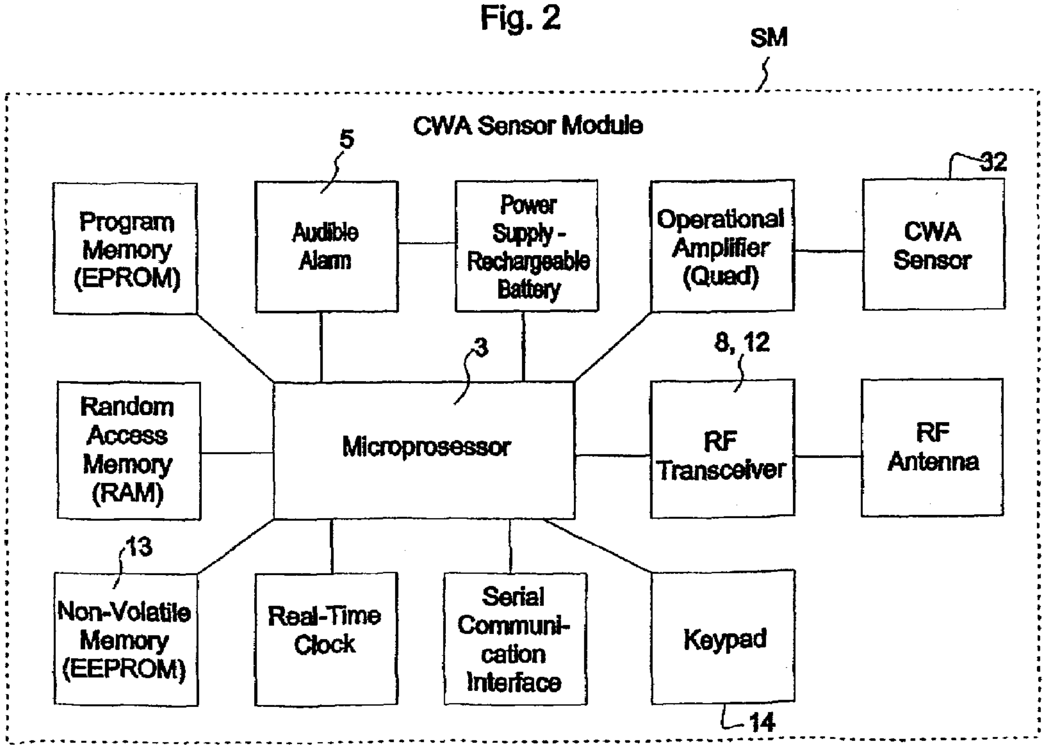
FIG. 3 shows a schematic block diagram of the sensor module according to another embodiment of the invention.

The sensor module SM in accordance with another embodiment of the invention, shown in FIG. 3, has the following parts and features:

Sensor module SM scans all sensor readings and transmits updated sensor data to both HUD and ICM, preferably every 3 seconds;

Chemical warfare agent sensor 32—senses the amount of CWA in the surroundings;

Control unit, such as microprocessor 3, tracks soldier's CWA dosage, then computes remaining operating time with current CWA concentration;

SOS-button—activates audible alarm and transmits signal to ICM;

Radio frequency (RF) receiver 12—receives text messages from ICM and forwards them to HUD;

Service records datalogger—records sensor module service and maintenance information in non-volatile memory 13;

"Automatic On" feature—activated upon turning on of the CWA sensor;

Optional button(s) to allow soldier to input his/her identification code;

Optional "Black Box" datalogger—records all sensor data during presence of CWA, with automatic "Time Stamping", Optional emergency locator transmitter (ELT), activated by SOS-button.

The sensor module SM is attached to the chemical warfare agent sensor. The sensor module SM has a housings for the electronic circuitry (shown in FIG. 3) of the sensor module SM, RF antenna housing and SOS-button.

Figure 11:
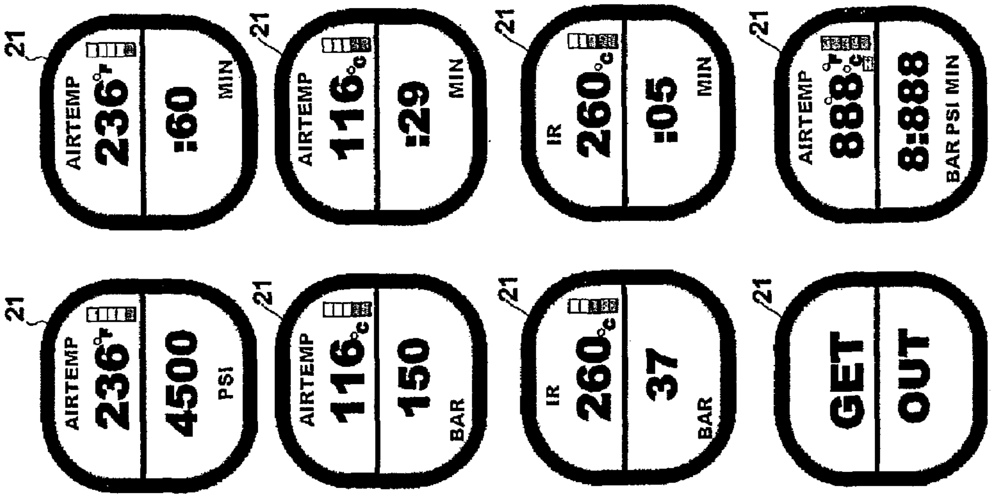
FIG. 11 shows examples of information which can be presented in the heads-up display according to the first embodiment of the invention, FIG. 12 show example of information which can be presented in the heads-up display according to another embodiment of the invention.
Figure 8:
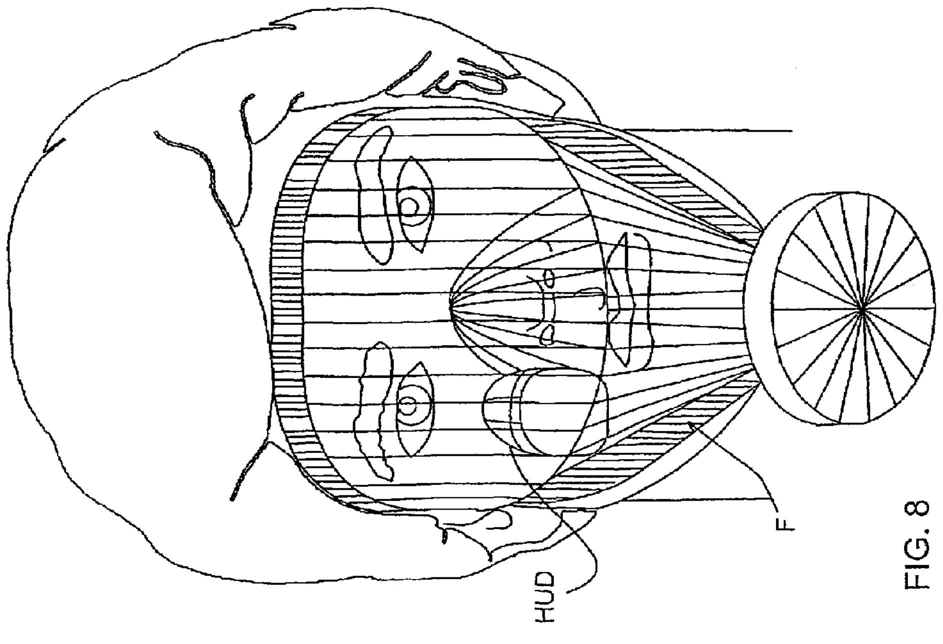
FIG. 8 shows a mask with the heads-up display.
Figure 9:
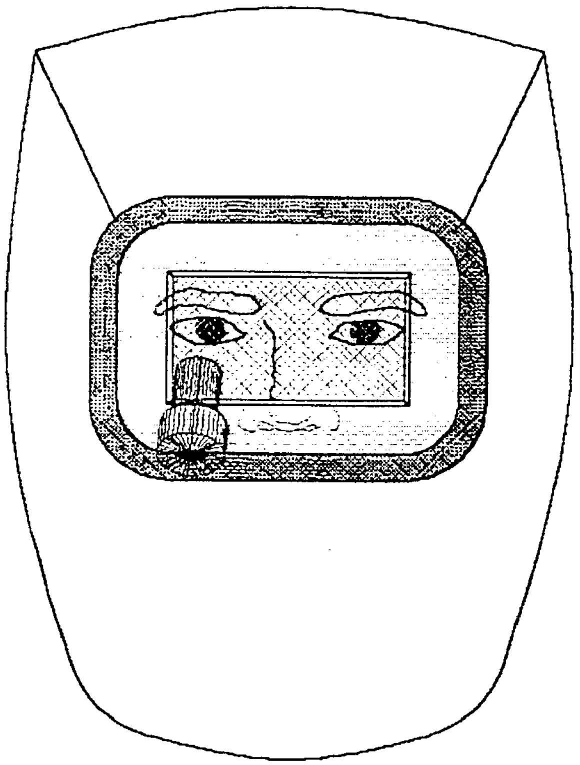
FIG. 9 shows a welders helmet with the heads-up display.

The heads-up display HUD is an optielectric, night-readable display which is mounted in a face mask F of the firefighter or soldier, or to the helmet of the welder as shown in FIG. 8 and FIG. 9. The heads-up display module HUD, as shown in FIG. 4, has the following parts and features:

Control unit such as a microprocessor 24, display 21, preferably electro-luminescent backlit 22, miniature digital LCD display or equivalent;

Use of optical enhancement to create an easily legible digital display, which can be located inside the face mask as shown in FIG. 8 as an example—specifically, an achromatic doublet lens 22, optimized to correct for on-axis spherical and chromatic aberrations, with extra long eye relief, positioned so as not to restrict the firefighter's forward field of view; RF receiver 25 for receiving data from the sensor module SM;

Housing 23 into which the display 21 and the lens 22 are fixed;

The display 21 in accordance with one embodiment of the invention is arranged to function as following indicators:

Pressure indicator—indicates pressure remaining in air tank;

Time remaining indicator—indicates air time remaining in minutes, at current consumption rate;

Ambient temperature indicator—displays ambient temperatures (compare FIG. 11):

Heat stress indicator—displays firefighter's cumulative heat stress level; This is indicated by a graphic of a column of 5 vertically spaced squares (FIG. 11). As the squares change color they represent an increase in the cumulative heat stress level. When all the squares have changed color it is time for the firefighter to leave the vicinity.

Figure 12:
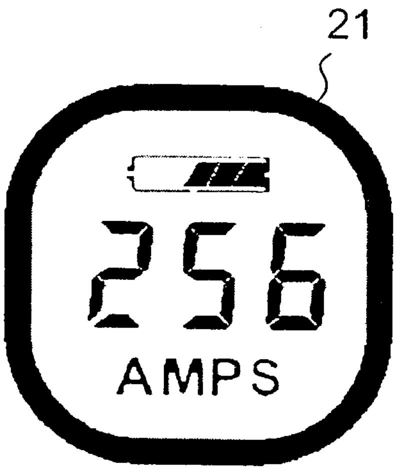

Flashover warning indicator—alerts firefighter of impending flashover dancer;

Infrared temperature indicator—displays infrared temperature of object that IR-sensor is pointed towards, whenever IR-sensor button is pushed (compare FIG. 8);

PASS device condition indicator—alerts firefighter of "Pre-Alert" PASS condition;

The display in accordance with another embodiment of the invention is arranged to function as following indicators:

amperage indicator—indicates the amperage that the welder is operating at. As illustrated in FIG. 12 this can also include a graphic representation of the amperage.

Figure 13B:
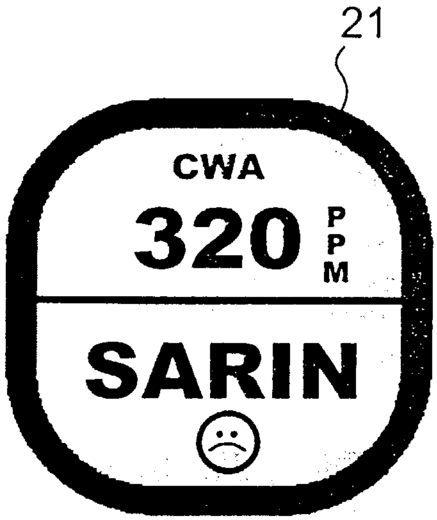
FIG. 13 shows examples of information which can be presented in the heads-up display according to another embodiment of the invention.
Figure 13A:
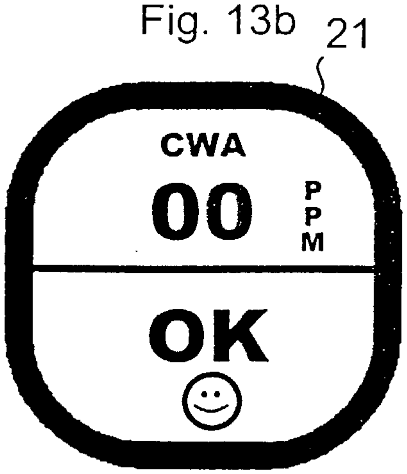
Figure 10:
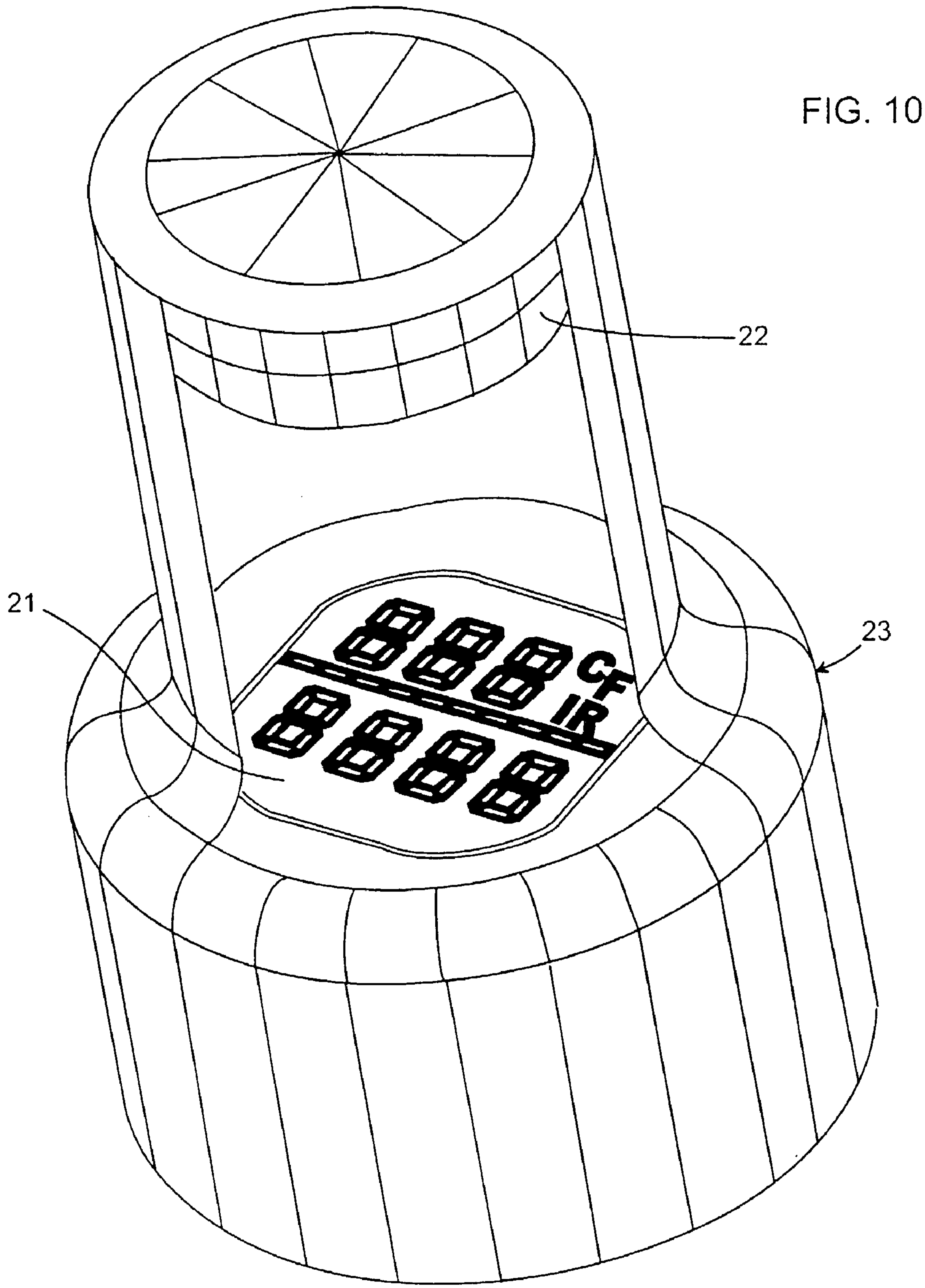
FIG. 10 shows more closely the heads-up display as perspective view.

The display in accordance with another embodiment of the invention is arranged to function as following indicators:

CWA indicator—indicates concentration of CWA in the surrounding and changes the color of the display depending the situation;

Time remaining indicator—indicates remaining operating time in minutes at current CWA concentration. As illustrated in FIGS. 13*a* and 13*b* this can also include a graphic, such as a smiley face.

Furthermore, the heads-up display module has:

"Sleep mode"—provides "Automatic On" feature and prolonged battery life;

Optional two-way RF voice communication between firefighter and incident commander.

Figure 5:
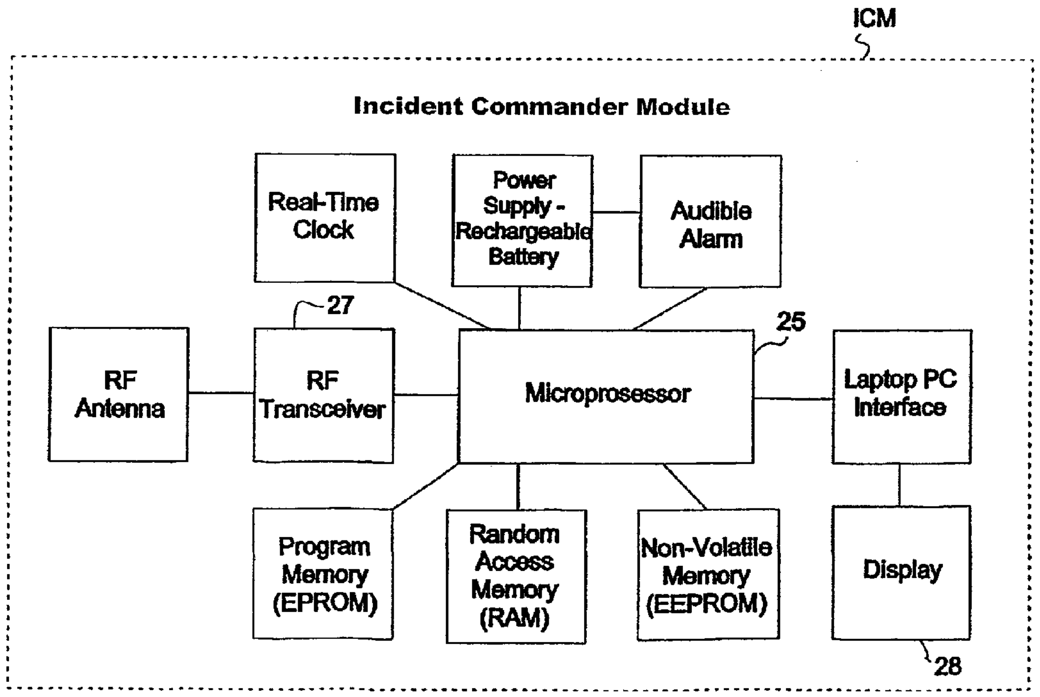
FIG. 5 shows a block diagram of the incident commander module.
Figure 14:
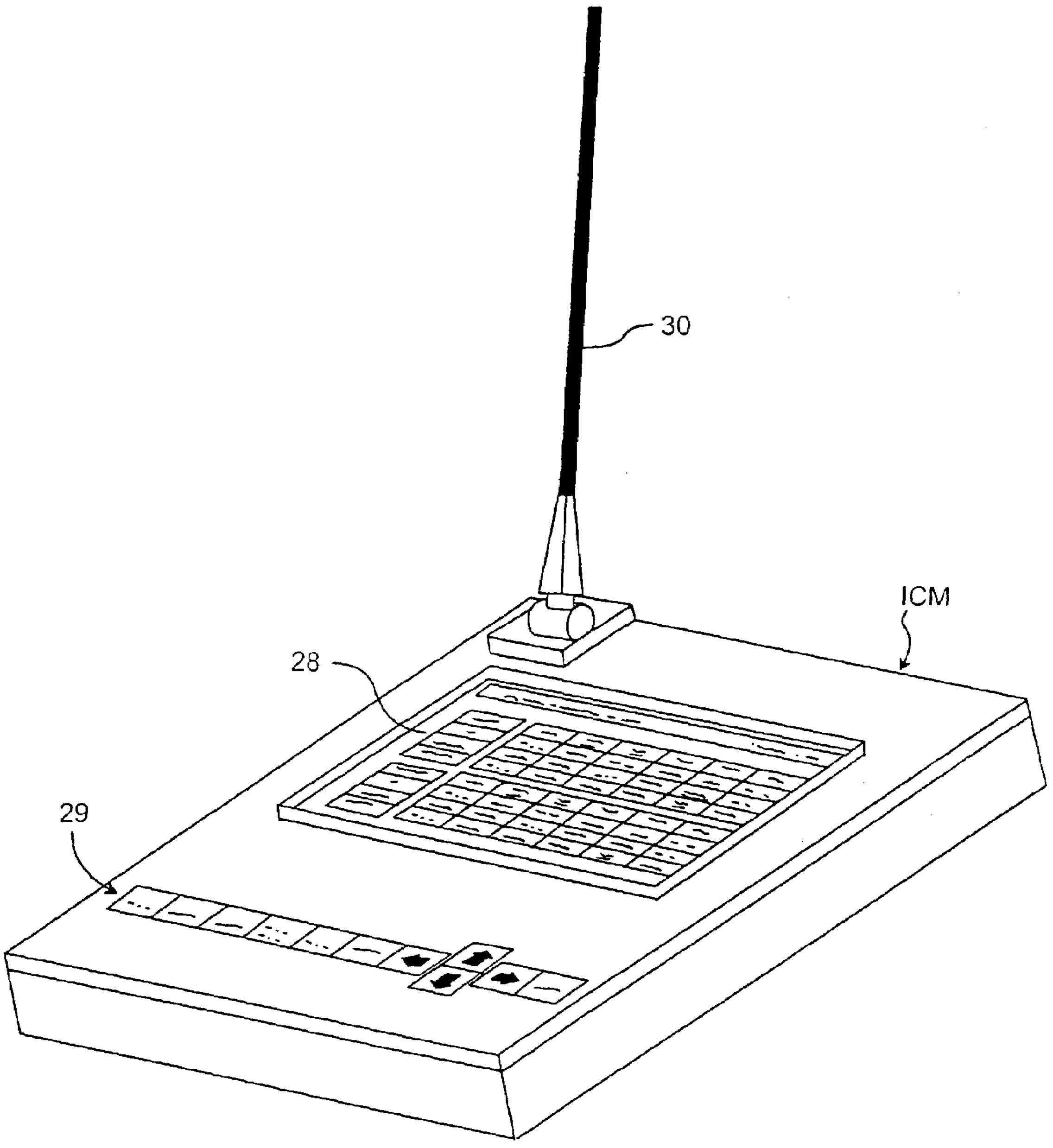
FIG. 14 shows a perspective view of the incident commander module.

The incident commander module ICM of one embodiment of the present invention provides the incident commander, who is commanding the operation, with real-time sensors data on all firefighters in the interior of the building or equivalent. The incident commander module ICM as shown in FIG. 5 and FIG. 14, has the following parts and features:

Control unit such as a microprocessor 26;

RF Transceiver 27, which receives continuous RF sensor data transmissions from up to 128 firefighters, specifically from the firefighter's sensor modules SM;

Display 28 such as backlit LCD display, indicates the following for each firefighter:

Elapsed time inside the fire;

Pressure in air tank;

Air time remaining in minute;

Ambient temperature reading;

IR sensor reading;

Heat stress level;

Flashover warming;

PASS device status, including "Pre-Alert" condition;

Receives "SOS" transmission and identifies firefighter in trouble;

Transmits text messages by means of the RF transceiver 27 to any selected firefighter or to all firefighters;

Illuminates "Service" icons, to indicate when upcoming service is due for ICM, HUDs or sensor modules;

"Black Box" datalogger built into ICM; records each firefighter's situation in real-time, as it occurs;

records any firefighter's "SOS" transmission in real-time, as it occurs;

records the ICM's text messages in real-time, as they occur;

records all service and maintenance records on each device;

automatically adds "Time/Date Stamp" to all records.

Field programming capacity—enables ICM to download identification codes and other information to non-volatile memory in sensor modules and HUDs;

Optional two-way RF voice communication between firefighter and incident commander.

The incident commander module ICM of another embodiment of the present invention provides the commanding officer, who is commanding certain part of the battlefield, with real-time sensors data on all soldiers in the area. The incident commander module ICM as shown in FIG. 5 and FIG. 14, has the following parts and features:

Control unit such as a microprocessor 26;

RF Transceiver 27, which receives continuous RF sensor data transmissions from up to 128 soldiers, specifically from the soldier's sensor modules SM;

Display 28 such as backlit LCD display, indicates the following for each firefighter:

Elapsed time under CWA;

CWA concentration in the surrounding;

current dosage of CWA;

remaining operating time in minutes;

Receives "SOS" transmission and identifies soldiers in trouble;

Transmits text messages by means of the RF transceiver 27 to any selected soldier or to all soldiers;

Illuminates "Service" icons, to indicate when upcoming service is due for ICM, HUDs or sensor modules;

"Black Box" datalogger built into ICM;

records each soldier's situation in real-time, as it occurs;

records any soldier's "SOS" transmission in real-time, as it occurs;

records the ICM's text messages in real-time, as they occur;

records all service and maintenance records on each device;

automatically adds "Time/Date Stamp" to all records.

Field programming capacity—enables ICM to download identification codes and other information to non-volatile memory in sensor modules and HUDs;

Optional two-way RF voice communication between soldier and incident commander.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

The invention claimed is:

1. A digital situation indicator, personal monitoring and alarm system for firefighters comprising a sensor module, an integral, self contained, display module, and an incident commander module; (SM) said sensor module includes plurality of sensors (1, 4) constructed and arranged for monitoring conditions in connection with a firefighter, said sensors include an ambient temperature sensor, and a pressure sensor for sensing the air pressure in the air tank; and a first control unit including a microcomputer (3) for analyzing data collected; said sensor module (SM) further including: a flashover warning alarm constructed and arranged for analyzing sensor data and determining when ambient conditions are appropriate for impending flashover; means for computing a cumulative heat stress level and activating a heat stress warning alarm after a predetermined heat stress level has been reached, an infrared temperature sensor (9) for detecting high temperature behind closed doors and inside walls and a visible light laser (11) to show with its beam where said sensor (9) is pointed, said infrared temperature sensor (9) having a switch (10) such as a button for activating said infrared temperature sensor; a personal alert safety system (PASS) having a motion sensor (6) and an alarm (5; 7); a SOS button (20); and a radio frequency transceiver (8, 12) constructed and arranged for transmitting sensor data, analyzed data and alarms to said display module and/or said incident commander module (ICM) and receiving messages from said incident commander module (ICM); said display module, positioned in a face mask of the firefighter and being constructed and arranged for displaying collected and analyzed data in a numerical or graphical format, and said incident commander module (ICM) positioned at a distance from the firefighter for providing an incident commander with real-time data from said sensors on all firefighters in the area, said incident commander module (ICM) including: a second control unit which includes a microprocessor (26); a radio frequency transceiver (27) constructed and arranged for receiving sensor data transmissions and SOS transmissions from a plurality of firefighters, especially from their sensor modules (SM), and for transmitting messages to any selected firefighter or to all firefighters, and a display (28) for indicating information from the firefighters said display module includes a third control unit which includes a microprocessor (24), a display, which comprises an electro-luminescent backlit (22) miniature, digital liquid crystal display (21), and optical enhancement means, which comprises an achromatic doublet lens (22), optimized to correct for on-axis spherical and chromatic aberrations, said display (21) is positioned in a face mask.

2. A digital situation indicator, personal monitoring and alarm system for firefighters, according to claim 1, characterized in that said sensor module (SM) includes an emergency locator transmitter (ELT) activated by a personal alert safety system (PASS) or a SOS button (20).

3. A digital situation indicator, personal monitoring and alarm system for firefighters, according to claim 2, characterized in that said sensor module (SM) is attached to a pressure gage hose (15) of the air tank (2).

4. A digital situation indicator, personal monitoring and alarm system for firefighters, according to claim 1, characterized in that said sensor module further comprises two housings (17, 19) connected to each other, a first housing (17) containing electronic circuitry and a second housing (19) containing said infrared temperature sensor (9) and said visible light laser in coaxial alignment (11) and further containing said infrared temperature sensor activating switch (10) and a SOS-button (20).

5. A digital situation indicator, personal monitoring and alarm system for firefighters, according to claim 1, characterized in that said display (21) comprises at least one of the following indicators: a pressure indicator for indicating pressure remaining in the air tank; a time remaining indicator for indicating air remaining in minutes at a current consumption rate; an ambient temperature indicator for displaying ambient temperatures; a heat stress indicator for displaying firefighter's cumulative heat stress level; a flashover warning indicator for alerting the firefighter of impending flashover danger; a personal alert safety system (PASS) device condition indicator for alerting the firefighter of pre-alert condition; and an infrared temperature indicator for displaying the infrared temperature of the object that the infrared temperature sensor (9) is pointed towards.

6. A digital situation indicator, personal monitoring and alarm system for firefighters, according to claim 5, characterized in that said display module has two-way radio frequency voice communication between any of the firefighters and an incident commander utilizing said incident commander module (ICM).

7. A digital situation indicator, personal monitoring and alarm system for firefighters, according to claim 6, characterized in that said incident commander module (ICM) includes a transceiver which is constructed and arranged to transmit text messages to any selected firefighter or to all the firefighters.

8. A digital situation indicator, personal monitoring and alarm system for firefighters, according to claim 7, characterized in that a display (28) of said incident commander module (ICM) is constructed and arranged to indicate the following information for each firefighter: elapsed time inside the fire; pressure in the air tank and amount of air remaining in the air tank in minutes; ambient temperature; heat stress level; flashover warning; status of the personal alert safety system (PASS) device; and temperature detected by the infrared temperature sensor (9).

9. A digital situation indicator, personal monitoring and alarm system for firefighters, according to claim 8, characterized in that said incident commander module (ICM) includes a datalogger which is constructed and arranged to record the following information each firefighter's situation in real-time; any firefighter's SOS transmission; all service and maintenance records on each device; and automatically add a time/date stamp to all records.

10. A digital situation indicator, personal monitoring and alarm system for firefighters, according to claim 9, characterized in that said incident commander module (ICM) includes means which enables said incident commander module to down load identification codes and other information from said incident commander module (ICM) to said sensor module (SM) and said heads-up display module of the firefighter.

11. The digital situation indicator of claim 5, wherein said sensor module includes a processing means operable to compute the air consumption rate based on derived air pressure data and the air time remaining based on the air consumption rate, whereby the air time remaining is displayed on said display of said display module.

12. The digital situation indicator of claim 7, wherein said sensor module further includes a processing means operable to perform the steps of:

reading pre-specified Alarm Limits;

reading said ambient temperature data and storing said ambient temperature data in association with sequential time data;

calculating the rate of increase of the ambient temperature with respect to time;

determining if the ambient temperature is within a specified ambient temperature alarm limit;

determining if the rate of increase is within a specified rate of increase limit;

generating a Flashover Alarm if both the ambient temperature and the rate of increase exceed the respective alarm limits; and transmitting the Flashover Alarm to said display module; and displaying the Flashover Alarm on said display of said display module.

13. The digital situation indicator of claim 7, wherein said sensor module further includes a processing means operable to perform the steps of:

reading pre-specified Alarm Limits;

reading said ambient temperature data and storing said ambient temperature data in association with sequential time data;

calculating a Cumulative Heat Stress Level based on the rate of increase of the ambient temperature with respect to time;

determining if the Cumulative Heat Stress Level is within a specified alarm limit;

generating a Heat Stress Warning Alarm if the alarm limit is exceeded;

transmitting the Heat Stress Warning Alarm to said display module; and displaying the Heat Stress Warning Alarm on said display of said display module.

14. A digital situation indicator, for firefighters, comprising a sensor module(SM), an integral, self contained, display module and an incident commander module; said sensor module including plurality of sensors (1,4) constructed and arranged for monitoring conditions in connection with a firefighter, said sensors including an ambient temperature sensor, and an air tank pressure sensor; and a first control unit including a microcomputer (3) constructed and arranged for analyzing the data collected by said sensors; said sensor module (SM) further including: a flashover warning alarm constructed and arranged for analyzing sensor data and detecting when ambient conditions are appropriate for impending flashover; means for computing cumulative heat stress level and a heat stress warning alarm; a personal alert safety system (PASS) including motion sensor (6) and alarm (5;7); SOS button (20); and a radio frequency transceiver (8, 12) constructed and arranged for transmitting sensor data, analyzed data and alarms to said heads-up display module and/or said incident commander module (ICM) and receiving messages from said incident commander module (ICM); said heads-up display module, positioned in a face mask of the firefighter constructed and arranged for displaying collected and analyzed data in a numerical format and further including a liquid crystal display and an optical lens constructed and arranged to correct for on-axis spherical and chromatic aberrations of said liquid crystal display and said incident commander module (ICM) positioned at a distance from the firefighter constructed and arranged for providing an incident commander with real-time sensors data on all firefighters in the area, said incident commander module (ICM) including: a second control unit including a microprocessor (26); a radio frequency transceiver (27) constructed and arranged for receiving sensor data transmissions and SOS transmissions from a plurality of firefighters, especially from their sensor modules (SM), and for transmitting messages to any selected firefighter or to all firefighters; and a display (28) constructed and arranged for indicating information from the firefighters.

* * * * *